United States Patent
Chikazawa et al.

(10) Patent No.: US 10,766,783 B2
(45) Date of Patent: Sep. 8, 2020

(54) MAGNESIUM OXIDE-CONTAINING SPINEL POWDER AND METHOD FOR PRODUCING SAME

(71) Applicant: TATEHO CHEMICAL INDUSTRIES CO., LTD., Ako-shi (JP)

(72) Inventors: Tomoaki Chikazawa, Ako (JP); Akinori Saito, Ako (JP); Yoshihisa Ohsaki, Ako (JP)

(73) Assignee: TATEHO CHEMICAL INDUSTRIES CO., LTD., Ako-shi (JP)

( * ) Notice: Subject to any disclaimer, the term of this patent is extended or adjusted under 35 U.S.C. 154(b) by 0 days.

(21) Appl. No.: 16/335,489

(22) PCT Filed: Sep. 26, 2017

(86) PCT No.: PCT/JP2017/034637
§ 371 (c)(1),
(2) Date: Mar. 21, 2019

(87) PCT Pub. No.: WO2018/056456
PCT Pub. Date: Mar. 29, 2018

(65) Prior Publication Data
US 2019/0300377 A1    Oct. 3, 2019

(30) Foreign Application Priority Data

Sep. 26, 2016 (JP) .................. 2016-186656

(51) Int. Cl.
| | |
|---|---|
| C04B 35/443 | (2006.01) |
| C01F 7/16 | (2006.01) |
| C01F 5/08 | (2006.01) |
| C04B 35/626 | (2006.01) |

(52) U.S. Cl.
CPC .......... *C01F 7/162* (2013.01); *C01F 5/08* (2013.01); *C01F 7/16* (2013.01); *C04B 35/443* (2013.01); *C04B 35/626* (2013.01); *C01P 2002/32* (2013.01); *C01P 2004/51* (2013.01); *C01P 2004/61* (2013.01); *C01P 2004/62* (2013.01); *C01P 2006/11* (2013.01); *C01P 2006/90* (2013.01)

(58) Field of Classification Search
CPC .............................. C04B 35/443; C01F 7/162
See application file for complete search history.

(56) References Cited

U.S. PATENT DOCUMENTS

| | | | |
|---|---|---|---|
| 8,673,796 B2 * | 3/2014 | Yoshimura ............ | C04B 35/443 264/653 |
| 2012/0093713 A1 * | 4/2012 | Yoshimura ........ | C04B 35/63448 423/600 |

FOREIGN PATENT DOCUMENTS

| | | |
|---|---|---|
| JP | 63-53130 B2 | 10/1988 |
| JP | 63-56174 B2 | 11/1988 |
| JP | 9-142916 A | 6/1997 |
| JP | 2001-2413 A | 1/2001 |

OTHER PUBLICATIONS

International Search Report dated Nov. 21, 2017 in PCT/JP2017/034637 filed Sep. 26, 2017.

* cited by examiner

*Primary Examiner* — Karl E Group
(74) *Attorney, Agent, or Firm* — Oblon, McClelland, Maier & Neustadt, L.L.P.

(57) ABSTRACT

Provided is a magnesium oxide-containing spinel powder capable of producing a ceramic sintered body having high strength and excellent strength stability. In the magnesium oxide-containing spinel powder, a 50% particle diameter (D50) is 0.30 to 10.00 μm, a ratio (D90-D50)/(D50-D10) of a difference between a 90% particle diameter (D90) and the 50% particle diameter (D50) and a difference between the 50% particle diameter (D50) and a 10% particle diameter (D10) is 1.0 to 5.0, and a composition ratio of Mg and Al in terms of an oxide equivalent content is 50 to 90% by weight of MgO and 10 to 50% by weight of $Al_2O_3$.

5 Claims, No Drawings

US 10,766,783 B2

MAGNESIUM OXIDE-CONTAINING SPINEL POWDER AND METHOD FOR PRODUCING SAME

TECHNICAL FIELD

The present invention relates to a magnesium oxide-containing spinel powder usable as a raw material for a ceramic sintered body, and a method for producing the magnesium oxide-containing spinel powder.

BACKGROUND ART

Magnesium oxide is a material which has a high melting point of about 2800° C., and is excellent in corrosion resistance, and sintered magnesium oxide and electromelted magnesium oxide are widely used as raw materials for magnesium oxide ceramic sintered bodies to be used for refractory materials.

However, magnesium oxide has a large thermal expansion coefficient of about $13.5 \times 10^{-6}/°$ C., and particles of magnesium oxide themselves are easily broken by cleavage. Due to such a property, magnesium oxide has a disadvantage of poor spalling resistance. In addition, magnesium oxide itself is a substance having high reactivity, and therefore has the problem that magnesium oxide easily reacts with moisture and the like in air, has reduced water resistance, and is difficult to handle.

It is known that a ceramic sintered body is produced using magnesium oxide-containing spinel ($MgAl_2O_4$) as an alternative material for magnesium oxide for improving spalling resistance and water resistance while maintaining the corrosion resistance of magnesium oxide in view of the above-mentioned problems.

PTL 1 discloses a method for producing a magnesia spinel powder, the method including the step of mixing aluminum hydroxide, magnesium hydroxide and a mineralizer, then firing the resultant mixture until achievement of a specified specific surface area (claim 1), and suggests that a sintered body is produced by firing the powder (paragraph [0001]) PTL 1 suggests that the mixed amount of aluminum hydroxide and magnesium hydroxide is consistent with the stoichiometric ratio of magnesia spinel (paragraph [0019]).

PTL 2 suggests that MgO-rich electromelted spinel is added in an amount of 5 to 100% to a spinel-containing refractory material (claim 1), and the MgO-rich electromelted spinel is a material in which the surfaces of magnesia (MgO) particles solid-dissolved with $Al_2O_3$ are entirely or partially covered with a spinel composition (paragraph [0010]).

PTL 3 discloses a method for producing a granulated material mainly composed of spinel, the method including blending magnesium hydroxide and/or magnesium oxide with aluminum hydroxide and/or aluminum oxide to prepare a raw material, bringing the raw material into a state of a cake containing water, and firing the cake in a rotary kiln at a maximum temperature of 1300° C. or higher to obtain a granular material having a spherical shape or an angular shape (claim 1).

PTL 4 discloses a method for producing a high-density spherical material mainly composed of spinel, the method including the step of blending magnesium hydroxide and/or magnesium oxide with aluminum hydroxide and/or aluminum oxide, forming the mixture into a semi-dried material containing water, firing the thus-obtained raw material at 1000° C. to 1400° C., then press-molding the raw material, and firing the obtained molded product in a rotary kiln at a temperature of 1500° C. or higher (claim 1).

CITATION LIST

Patent Literature

PTL 1: Japanese Patent Laid-Open Publication No. 2001-2413
PTL 2: Japanese Patent Laid-Open Publication No. 9-142916
PTL 3: Japanese Patent Publication No. 63-53130
PTL 4: Japanese Patent Publication No. 63-56174

SUMMARY OF INVENTION

Technical Problem

The technique described in PTL 1 makes it possible to easily produce a spinel powder without necessity of a special apparatus, but has the problem that a sintered body obtained by molding and sintering the resulting spinel powder has low strength, and strength stability is insufficient.

The spinel obtained by an electromelting method as described in PTL 2 has the problem that since the production method is an electromelting method, the spinel has a non-uniform composition, so that the strength of the sintered body cannot be controlled to be constant, although the resulting sintered body has relatively high strength.

PTL 3 describes production of a granular material which is mainly composed of spinel, and has a spherical or angular shape, but does not describe either that the granular material is a fine powder or that a sintered body having a desired shape is produced using as a raw material the granular material having the above-described shape. Even if a sintered body is produced using as a raw material the granular material having the above-described shape, there has been the problem that a sintered body having sufficient strength cannot be produced.

PTL 4 describes production of a high-density spherical material mainly composed of spinel, but does not describe either that the spherical material is a fine powder or that a sintered body having a desired shape is produced using the spherical material as a raw material. Even if a sintered body is produced using the spherical material as a raw material, there is the problem that a sintered body having sufficient strength cannot be produced.

It is known that spinel is produced by various methods as described above, but a spinel powder capable of giving a spinel ceramic sintered body satisfying strength and strength stability is not known.

In view of the above-described situations, an object of the present invention is to provide a magnesium oxide-containing spinel powder capable of producing a ceramic sintered body having high strength and excellent strength stability.

Solution to Problem

For solving the above-described problems, the present inventors have conducted various studies, and resultantly found that when a fine spinel powder is sintered, a ceramic sintered body having a uniform composition can be produced, and when the composition ratio of Mg and Al in the spinel powder is set within a specific range, and the particle diameter and particle size distribution of the spinel powder are each controlled to fall within a specific range, a ceramic sintered body satisfying both strength and strength stability is obtained, leading to the present invention.

That is, the present invention provides a magnesium oxide-containing spinel powder in which a volume-based cumulative 50% particle diameter (D50) in laser diffraction scattering particle size distribution measurement is 0.30 to 10.00 μm, a ratio (D90-D50)/(D50-D10) of a difference between a volume-based cumulative 90% particle diameter (D90) and the volume-based cumulative 50% particle diameter (D50) and a difference between the volume-based cumulative 50% particle diameter (D50) and a volume-based cumulative 10% particle diameter (D10) is 1.0 to 5.0, and a composition ratio of Mg and Al in terms of an oxide equivalent content is 50 to 90% by weight of MgO and 10 to 50% by weight of $Al_2O_3$.

Preferably, the magnesium oxide-containing spinel powder has a loose bulk density of 0.20 to 1.50 g/cm$^3$, and a tight bulk density of 0.30 to 2.50 g/cm$^3$.

Preferably, the ceramic sintered body obtained by firing a molded product of the magnesium oxide-containing spinel powder has a three-point bending strength of 150 MPa or more and a Weibull coefficient of 13.0 or more.

In addition, the present invention provides a method for producing the magnesium oxide-containing spinel powder, the method including the step of mixing at least one kind of magnesium source particles having a volume-based cumulative 50% particle diameter (D50) of 0.50 to 100.00 μm and selected from magnesium hydroxide particles, magnesium oxide particles, magnesium carbonate particles, basic magnesium carbonate particles, magnesium nitrate particles, magnesium acetate particles and magnesium sulfate particles, and at least one kind of aluminum source particles having a volume-based cumulative 50% particle diameter (D50) of 0.30 to 15.00 μm and selected from aluminum hydroxide particles, aluminum oxide particles, aluminum carbonate particles, aluminum nitrate particles, magnesium acetate particles and aluminum sulfate particles, then calcining the mixture at 900 to 1400° C. for 0.1 to 10.0 hours, and then performing grinding.

Advantageous Effects of Invention

According to the present invention, it is possible to provide a magnesium oxide-containing spinel powder capable of producing a ceramic sintered body having high strength and excellent strength stability.

DESCRIPTION OF EMBODIMENTS

Hereinafter, the present invention will be described in detail.

In a magnesium oxide-containing spinel powder of the present invention, a matrix of magnesium oxide and a matrix of aluminum oxide are not separated from each other unlike a mere mixture of magnesium oxide and aluminum oxide, and an oxide is formed in which magnesium and aluminum are generally or partially combined. Thus, the magnesium oxide-containing spinel powder of the present invention has a composition having higher uniformity.

In the magnesium oxide-containing spinel powder of the present invention, the content ratio of magnesium oxide is higher than the stoichiometric ratio of spinel. Specifically, the composition ratio of Mg and Al contained in the magnesium oxide-containing spinel powder of the present invention, in terms of an oxide equivalent content, is 50 to 90% by weight of MgO and 10 to 50% by weight of $Al_2O_3$ based on 100% by weight of both the oxides. When the composition ratio is within the above-mentioned range, the bending strength of the resulting ceramic sintered body increases. The ratios of MgO and $Al_2O_3$ are preferably 55 to 85% by weight and 15 to 45% by weight, respectively, more preferably 60 to 80% by weight of MgO and 20 to 40% by weight of $Al_2O_3$, respectively. When the content of MgO is more than 90% by weight, the thermal expansion coefficient increases, so that the spalling resistance decreases, and when the content of MgO is less than 50% by weight, the corrosion resistance decreases.

The purity of the magnesium oxide-containing spinel powder of the present invention is preferably 99.0% or more, more preferably 99.5% or more, still more preferably 99.9% or more. Here, the purity is a value obtained by calculating the content of impurities (components other than Mg, Al and O, e.g. Ca, Si, P, S, B, Fe, Ti, Zn, Cu and Ba) in the magnesium oxide-containing spinel powder in terms of an oxide equivalent content, and subtracting the content from 100%. The thermal expansion coefficient is deviated from a theoretical value under the influence of impurities, and therefore when the purity increases, the thermal expansion coefficient of the ceramic sintered body is stabilized. On the other hand, when the purity decreases, the thermal expansion coefficient of the ceramic sintered body varies.

The volume-based cumulative 50% particle diameter (D50) of the magnesium oxide-containing spinel powder of the present invention is 0.30 μm to 10.00 μm, more preferably 0.35 μm to 5.00 μm, still more preferably 0.40 μm to 3.00 μm. When the 50% particle diameter (D50) of the magnesium oxide-containing spinel powder is within the above-mentioned range, the density of the molded product and the strength of the ceramic sintered body increase. When the 50% particle diameter (D50) is less than 0.30 μm, the shrinkage ratio during drying or sintering increased, leading to generation of cracks etc. In addition, when the particle diameter is excessively too small, handleability is deteriorated. When the 50% particle diameter (D50) is larger than 10.00 μm, sinterability is deteriorated, and the strength of the sintered body is reduced. It is not preferable that the 50% particle diameter (D50) is larger than 10.00 μm because the sintering temperature must be increased in order to a high-strength and dense sintered body.

In the magnesium oxide-containing spinel powder of the present invention, the width of the particle size distribution is controlled, and specifically, in particle size distribution measurement, the ratio (D90-D50)/(D50-D10) of the difference between the volume-based cumulative 90% particle diameter (D90) and the volume-based cumulative 50% particle diameter (D50) and the difference between the volume-based cumulative 50% particle diameter (D50) and the volume-based cumulative 10% particle diameter (D10) is 1.0 to 5.0. When the ratio (D90-D50)/(D50-D10) is outside the above-mentioned range, strength and strength stability of the ceramic sintered body are deteriorated. The ratio (D90-D50)/(D50-D10) is more preferably 1.1 to 4.5, still more preferably 1.2 to 4.0.

In the present invention, D10, D50, and D90 are a volume-based cumulative 10% particle diameter, a volume-based cumulative 50% particle diameter and a volume-based cumulative 90% particle diameter, respectively, in laser diffraction scattering particle size distribution measurement.

The bulk density of the magnesium oxide-containing spinel powder of the present invention is preferably 0.20 to 1.50 g/cm$^3$ in terms of a loose bulk density and 0.30 to 2.50 g/cm$^3$ in terms of a tight bulk density. It is preferable that the bulk density is within the above-mentioned range because both the strength and the strength stability of the ceramic sintered body can be enhanced. It is more preferable that the loose bulk density is 0.25 to 1.20 g/cm$^3$, and the tight bulk density is 0.35 to 2.20 g/cm$^3$, and it is still more preferable that the loose bulk density is 0.28 to 1.00 g/cm$^3$, and the tight bulk density is 0.40 to 2.00 g/cm$^3$.

Production Method

An example of a method for producing the magnesium oxide-containing spinel powder of the present invention will now be described. The magnesium oxide-containing spinel powder of the present invention can be produced by mixing a powder composed of a magnesium source and a powder composed of an aluminum source to obtain a mixed powder, calcining and synthesizing the mixed powder at a high temperature to prepare a synthetic spinel raw material, and grinding the raw material so as to obtain a predetermined particle diameter and particle size distribution.

Usually, in a mere mixture of magnesium oxide and aluminum oxide, a matrix of magnesium oxide and a matrix of aluminum oxide are not fused together, and exist separately, but in the present invention, a magnesium source and an aluminum source are calcined and synthesized, and ground to form an oxide in which magnesium and aluminum are generally or partially combined, so that a magnesium oxide-containing spinel powder having a composition having higher uniformity is synthesized.

According to the present invention, a magnesium oxide-containing spinel powder can be produced without mixing a magnesium source and an aluminum source with a mineralizer such as aluminum fluoride or magnesium fluoride, which is described as an essential component in PTL 1.

In addition, in the magnesium oxide-containing spinel powder of the present invention, a composition distribution with magnesium and aluminum dispersed more uniformly is formed as compared to the electromelted spinel described in PTL 2, and therefore a ceramic sintered body having a small variation in strength and high stability can be obtained.

The magnesium source is not particularly limited, and examples thereof include magnesium hydroxide, magnesium oxide, magnesium carbonate, basic magnesium carbonate, magnesium nitrate, magnesium acetate and magnesium sulfate. The method for producing a magnesium source is not particularly limited, and examples of the method for producing magnesium hydroxide include a method in which an alkaline aqueous solution of ammonia, calcium hydroxide, sodium hydroxide or the like is added to a magnesium chloride-containing aqueous solution such as bittern, seawater or irrigation water, and the mixture is reacted to obtain magnesium hydroxide. Magnesium oxide obtained by firing the magnesium hydroxide thus obtained, and pulverizing the magnesium oxide to a desired particle size can also be used as a magnesium source. Further, as the magnesium source, a commercially available magnesium source can be used.

The magnesium source to be used is preferably in the form of fine particles, and the particle size thereof is preferably 0.50 to 100.00 μm in terms of a volume-based cumulative 50% particle diameter (D50). When the particle size is within the above-mentioned range, it is easy to achieve the particle size distribution of the magnesium oxide-containing spinel powder of the present invention. The particle size more preferably is 5.00 to 80.00 μm, still more preferably 10.00 to 50.00 μm.

The aluminum source is not particularly limited, and examples thereof include aluminum hydroxide, aluminum oxide, aluminum carbonate, aluminum nitrate, aluminum acetate, and aluminum sulfate. The method for producing an aluminum source is not particularly limited, and examples of the method for producing aluminum hydroxide include a method in which bauxite is reacted with a sodium hydroxide aqueous solution under pressure and heating, the obtained solution is filtered to extract a sodium aluminate solution, and the solution is cooled to obtain aluminum hydroxide. In addition, aluminum oxide obtained by firing the thus-obtained aluminum hydroxide, and grinding the aluminum oxide to a desired particle size can also be used as an aluminum source. Further, as the aluminum source, a commercially available aluminum source can also be used.

The aluminum source to be used is preferably in the form of fine particles, and the particle size thereof is preferably 0.30 to 15.00 μm in terms of a volume-based cumulative 50% particle diameter (D50). When the particle size is within the above-mentioned range, it is easy to achieve the particle size distribution of the magnesium oxide-containing spinel powder of the present invention. In addition, it is not preferable that the particle size of the aluminum source is above the above-described range because a spinel phase obtained by combining magnesium oxide and aluminum oxide is not sufficiently formed even when calcination is performed, and a matrix of aluminum oxide is apt to remain. The particle size of the aluminum source is more preferably 0.50 to 10.00 μm, still more preferably 1.00 to 5.00 μm.

A powdered magnesium source and a powdered aluminum source are thoroughly mixed at an arbitrary ratio while consideration is given to the composition ratio of magnesium and aluminum in the magnesium oxide-containing spinel powder to be produced. The obtained mixed powder is calcined to obtain a synthetic spinel raw material in which magnesium oxide and aluminum oxide are combined. The conditions for calcination are not particularly limited, but it is preferable that the temperature is 900 to 1400° C. and the time is 0.1 to 10.0 hours. More preferably, the temperature is 950 to 1300° C., and the time is 0.5 to 8.0 hours. Still more preferably, the temperature is 1000 to 1200° C., and the time is 1.0 to 5.0 hours. When the conditions for calcination are as described above, a spinel phase is sufficiently formed, and the magnesium oxide-containing spinel powder of the present invention, which satisfies a desired particle diameter and particle size distribution, is easily obtained by the following grinding step. When the temperature at the time of calcination is higher than 1400° C., or the calcination time is longer than 10.0 hours, sintering proceeds to an excessive degree in the calcination step, and it is difficult to obtain a desired particle diameter even when grinding operation is performed.

The synthesized spinel raw material obtained by calcination is ground so as to obtain a desired particle diameter and particle size distribution, whereby the magnesium oxide-containing spinel powder of the present invention can be obtained. Suitable conditions for grinding depend on the particle size and composition ratio of the magnesium source and the aluminum source, and the conditions for calcination, and therefore are not limited to a specific range. However, by appropriately adjusting various conditions such as a grinding apparatus, a rotation number and a treatment time at the time of grinding the obtained synthetic spinel raw material, a desired particle diameter and particle size distribution can be achieved. Examples of the grinding apparatus include grinders such as a jaw crusher, a gyratory crusher, a cone crusher, an impact crusher, a roll crusher, a cutter mill, a stamp mill, a ring mill, a roller mill, a jet mill, a hammer mill, a rotating mill, a vibration mill, a planetary mill, a ball mill and a cyclone mill.

Sintered Body

A ceramic sintered body having a desired shape can be produced by forming a granulated material of the magnesium oxide-containing spinel powder of the present invention, then molding the granulated material into a desired shape, and firing the molded product. The corrosion resistance, spalling resistance and thermal expansion coefficient of the ceramic sintered body produced according to the present invention can be easily controlled by adjusting the composition ratio of Mg and Al in the magnesium oxide-containing spinel powder in advance.

Conditions for performing granulation are not particularly limited, and may be general conditions for forming a granulated material from an inorganic powder. Granulation can be performed at room temperature using a granulating apparatus such as a tumbling granulating apparatus, a fluidized bed granulating apparatus, a stirring granulating apparatus, a compression granulating apparatus or an extrusion granulating apparatus. As necessary, a general binder may be mixed with or sprayed to the magnesium oxide-containing spinel powder to form a granulated material. The usable binder is not particularly limited, and an organic binder such as nonionic, cationic, or anionic organic binder can be appropriately used. The use amount of the binder is 1 to 30 parts by weight based on 100 parts by weight of the spinel powder. The size of the granulated material is not particularly limited, but may be, for example, about 0.10 to 1.00 mm.

The obtained granulated material is molded into a desired shape to obtain a molded product, and the molded product is fired to produce a ceramic sintered body. The molding method is not particularly limited, and for example, press molding, extrusion molding, injection molding or the like can be used. The press molding can be performed at a surface pressure of 30 to 300 MPa using, for example, a uniaxial pressing machine at a surface pressure of 30 to 300 MPa. The conditions for firing are not particularly limited, and firing can be performed at a temperature of 1400 to 1800° C. for a time of 1.0 to 10.0 hours.

Preferably, the ceramic sintered body obtained by firing the molded product of the magnesium oxide-containing spinel powder of the present invention has a three-point bending strength of 150 MPa or more and a Weibull coefficient of 13.0 or more when the sintered body is produced under such a condition that press molding is performed at a surface pressure of 134 MPa, and firing is then performed at 1600° C. for 4 hours. When the bending strength and the Weibull coefficient are each in the above-mentioned range, the ceramic sintered body can be said to have sufficiently high strength and excellent strength stability.

EXAMPLES

Hereinafter, the present invention will be described in further detail by way of examples, but the present invention is not limited to these examples.

Test Method

(1) Bending Strength Test Method

A bending strength test was conducted in accordance with the three-point bending test method in JIS-R-1601: 2008 (Bending Strength Test Method for Fine Ceramics at room temperature). The shape of the test piece (ceramic sintered body) is a columnar shape having an oblong cross-section. The ceramic sintered body was cut and polished so as to have a dimension of 50 mm in total length, 4.0±0.1 mm in width and 3.0±0.1 mm in thickness. A Tensilon universal material tester (RTA-500 manufactured by Orientec Co., Ltd.) was used as a measuring apparatus. The test piece was placed on a support having a span width of 40 mm, a crosshead was pressed at a displacement speed of 0.5 mm/min from the upper part to apply a load to the test piece inside a test jig, and the maximum load was measured until the test piece was broken. From the maximum load, the bending strength was calculated in accordance with the following calculation formula.

$$\sigma_{b3} = 3PL/2 \, wt^2$$

Here, $\sigma_{b3}$ is a three-point bending strength (MPa), P is a maximum load (N) in breakage of the test piece, L is a distance between external fulcrums (mm), w is a width (mm) of the test piece, and t is a thickness (mm) of the test piece.

(2) Method for Evaluation of WEIBULL Coefficient

The Weibull coefficient was calculated in accordance with JIS-R-1625-2010 (Weibull Statistical Analysis Method of Data of Strength of Fine Ceramics). As the Weibull coefficient value increases, the width of the intensity distribution decreases, and stability is improved. The values of the three-point bending strength $\sigma$ (n=15 to 30) calculated by the bending strength test method were put in the ascending order, and the cumulative breakage probability Fi of the data was determined by the average rank method.

$$Fi = i/(n+1)$$

Here, n is the number of samples, and i is a rank (rank number) when values are put in the ascending order.

The values of $\ln\sigma$ and $\ln\ln\{1/(1-Fi)\}$ were calculated, $\ln\sigma$ was plotted on the abscissa, $\ln\ln\{1/(1-Fi)\}$ was plotted on the ordinate, a line fitting the data was drawn, and the Weibull coefficient was calculated.

(3) Method for Evaluation of Bulk Density

The bulk density was measured using a powder characteristic measuring apparatus (Powder Tester) (PT-N manufactured by Hosokawa Micron Corporation).

The loose bulk density is a ratio of the mass of a powder sample in a non-tapped (loose) state to the volume of a powder including the factor of the interparticle void volume. For the loose bulk density, a cup having an internal volume of 100 cm$^3$ was set in the apparatus, a sieve with a mesh opening size of 710 μm was set over the cup, 300 g of a magnesium oxide-containing spinel powder was put on the sieve, and the powder was caused to fall down into the cup by giving vibrations to the extent that the powder overflowed. A heap of the powder filling the cup was cut by rubbing using a blade, the weight of the powder was measured, and the loose bulk density was calculated. The loose bulk density was measured three times, and an average thereof was recorded.

The tight bulk density is an increased bulk density obtained after mechanical tapping of the container containing the powder sample. For the tight bulk density, the cap was mounted over the cup, the magnesium oxide-containing spinel powder was thoroughly put up to the top of the cap, and the cup was tapped 180 times. After completion of tapping, the cap was removed, the powder in the cup was cut by rubbing using a blade, the weight of the powder was measured, and the tight bulk density was calculated. The tapping operation was further repeated 360 times, the weight of the powder was similarly measured, and when the weight difference between the measured weights exceeded 2%, the tapping operation was further repeated 180 times until the weight difference was less than 2%. The tight bulk density was measured three times, and an average thereof was recorded.

(4) Method for Evaluation of Particle Diameter

The volume-based cumulative 10% particle diameter, the volume-based cumulative 50% particle diameter and the volume-based cumulative 90% particle diameter (D10, D50 and D90) of each powder were measured using a laser diffraction scattering particle size distribution measuring apparatus (MT3300 manufactured by Nikkiso Co., Ltd.). Methanol was used as a solvent, dispersion treatment was performed at 120 W for 3 minutes by an ultrasonic homogenizer (US-300T manufactured by Nippon Seiki Seisakusho Co., Ltd.), and the diameters of particles were then measured. The value of (D90-D50)/(D50-D10) was calculated from the obtained values of diameters of particles.

(5) Method for Calculating Composition Ratio and Purity of Magnesium Oxide-Containing Spinel Powder Composition analysis of the magnesium oxide-containing spinel powder was performed by a glass bead method using a multi-element simultaneous fluorescent X-ray analyzer (Simultix 12 manufactured by Rigaku Corporation). The content of each element was calculated in terms of an oxide equivalent content, and the composition ratio of magnesium oxide and aluminum oxide was calculated. In addition, the content of Ca, Si, P, S, B, Fe, Ti, Zn, Cu and Ba as main impurities were calculated in terms of an oxide equivalent content, and the content was subtracted from 100% to calculate the purity of the magnesium oxide-containing spinel powder.

(6) Method for Calculating Purity of Magnesium Hydroxide and Aluminum Hydroxide

Using a multi-element simultaneous fluorescent X-ray analyzer (Simultix 12 manufactured by Rigaku Corporation) as in (5), the content of Ca, Si, P, S, Fe, B and Na as main impurities was calculated in terms of an oxide equivalent content, and the content was subtracted from 100% to calculate the purity of each of magnesium hydroxide and aluminum hydroxide.

Example 1

A magnesium chloride aqueous solution adjusted so as to have a Mg ion concentration of 2.0 mol/L and a solution prepared by adding pure water to a sodium hydroxide solution and adjusted so as to have a concentration of 2.7 mol/L were fed to a reaction tank by a constant rate pump to carry out a continuous chemical combination reaction in such a manner that the reaction ratio of sodium hydroxide to magnesium chloride was 90 mol %. The reaction slurry was retained in the reaction tank for 30 minutes, and caused to overflow from the reaction tank, so that a magnesium hydroxide slurry was recovered. The slurry was filtered, washed with water, and dried to obtain a dried powder of magnesium hydroxide. The purity of the obtained dried powder of magnesium hydroxide was 99.9%, and the cumulative 50% particle diameter (D50) was 33.06 μm.

An aluminum hydroxide powder having a purity of 99.7% and a cumulative 50% particle diameter (D50) of 1.46 μm was blended with the magnesium hydroxide dry powder obtained by the above-described method in such a manner that the composition ratio of Mg and Al ($MgO:Al_2O_3$) was 70:30 in terms of an oxide equivalent ratio, and the mixture was thoroughly mixed uniformly in a dry process to obtain a mixed powder of magnesium hydroxide and aluminum hydroxide.

The obtained mixed powder was calcined in an electric furnace at 1000° C. for 1 hour to obtain a synthetic spinel raw material. The synthetic spinel raw material was ground with a ball mill for 4 hours to obtain a magnesium oxide-containing spinel powder having a cumulative 50% particle diameter (D50) of 1.97 μm.

The obtained magnesium oxide-containing spinel powder and an anionic organic binder solution were put in a universal mixing stirrer in an amount of 4.4 parts by weight based on 100 parts by weight of the magnesium oxide-containing spinel powder, and the mixture was granulated to a granulation diameter of 0.10 to 1.00 mm at room temperature. This granulated product was press-molded by a uniaxial pressing machine at a molding pressure of 134 MPa in terms of a surface pressure to obtain a molded product.

The obtained molded product was fired in an electric furnace at 1600° C. for 4 hours to obtain a ceramic sintered body having a total length of 50 mm, a width of 4.0 mm and a thickness of 3.0 mm.

Example 2

A mixed powder of magnesium hydroxide and aluminum hydroxide was prepared by blending magnesium oxide and aluminum oxide in such a manner that the composition ratio of Mg and Al was 50:50 ($MgO:Al_2O_3$) in terms of an oxide equivalent ratio, and the mixed powder was then calcinated in an electric furnace at 1000° C. for 1 hour, and ground by a ball mill for 4 hours to obtain a magnesium oxide-containing spinel powder having a cumulative 50% particle diameter (D50) of 1.94 Using the obtained magnesium oxide-containing spinel powder, granulation, molding and firing were performed in the same manner as in Example 1 to obtain a ceramic sintered body having a predetermined shape.

Example 3

A mixed powder of magnesium hydroxide and aluminum hydroxide was prepared by blending magnesium oxide and aluminum oxide in such a manner that the composition ratio of Mg and Al was 60:40 ($MgO:Al_2O_3$) in terms of an oxide equivalent ratio, and the mixed powder was then calcinated in an electric furnace at 1000° C. for 1 hour, and ground by a ball mill for 4 hours to obtain a magnesium oxide-containing spinel powder having a cumulative 50% particle diameter (D50) of 1.86 μm. Using the obtained magnesium oxide-containing spinel powder, granulation, molding and firing were performed in the same manner as in Example 1 to obtain a ceramic sintered body having a predetermined shape.

Example 4

A mixed powder of magnesium hydroxide and aluminum hydroxide was prepared by blending magnesium oxide and aluminum oxide in such a manner that the composition ratio of Mg and Al was 80:20 (MgO:Al$_2$O$_3$) in terms of an oxide equivalent ratio, and the mixed powder was then calcinated in an electric furnace at 1000° C. for 1 hour, and ground by a ball mill for 4 hours to obtain a magnesium oxide-containing spinel powder having a cumulative 50% particle diameter (D50) of 1.69 μm. Using the obtained magnesium oxide-containing spinel powder, granulation, molding and firing were performed in the same manner as in Example 1 to obtain a ceramic sintered body having a predetermined shape.

Example 5

A mixed powder of magnesium hydroxide and aluminum hydroxide was prepared by blending magnesium oxide and aluminum oxide in such a manner that the composition ratio of Mg and Al was 90:10 (MgO:Al$_2$O$_3$) in terms of an oxide equivalent ratio, and the mixed powder was then calcinated in an electric furnace at 1000° C. for 1 hour, and ground by a ball mill for 4 hours to obtain a magnesium oxide-containing spinel powder having a cumulative 50% particle diameter (D50) of 1.74 μm. Using the obtained magnesium oxide-containing spinel powder, granulation, molding and firing were performed in the same manner as in Example 1 to obtain a ceramic sintered body having a predetermined shape.

Example 6

A mixed powder of magnesium hydroxide and aluminum hydroxide was prepared by blending magnesium oxide and aluminum oxide in such a manner that the composition ratio of Mg and Al was 70:30 (MgO:Al$_2$O$_3$) in terms of an oxide equivalent ratio, and the mixed powder was then calcinated in an electric furnace at 1200° C. for 1 hour, and ground by a ball mill for 4 hours to obtain a magnesium oxide-containing spinel powder having a cumulative 50% particle diameter (D50) of 2.20 μm. Using the obtained magnesium oxide-containing spinel powder, granulation, molding and firing were performed in the same manner as in Example 1 to obtain a ceramic sintered body having a predetermined shape.

Example 7

A mixed powder of magnesium hydroxide and aluminum hydroxide was prepared by blending magnesium oxide and aluminum oxide in such a manner that the composition ratio of Mg and Al was 70:30 (MgO:Al$_2$O$_3$) in terms of an oxide equivalent ratio, and the mixed powder was then calcinated in an electric furnace at 1100° C. for 1 hour, and ground by a ball mill for 8 hours to obtain a magnesium oxide-containing spinel powder having a cumulative 50% particle diameter (D50) of 0.44 μm. Using the obtained magnesium oxide-containing spinel powder, granulation, molding and firing were performed in the same manner as in Example 1 to obtain a ceramic sintered body having a predetermined shape.

Example 8

A mixed powder of magnesium hydroxide and aluminum hydroxide was prepared by blending magnesium oxide and aluminum oxide in such a manner that the composition ratio of Mg and Al was 70:30 (MgO:Al$_2$O$_3$) in terms of an oxide equivalent ratio, and the mixed powder was then calcinated in an electric furnace at 1000° C. for 1 hour, and ground by a ball mill for 6 hours to obtain a magnesium oxide-containing spinel powder having a cumulative 50% particle diameter (D50) of 1.63 μm. Using the obtained magnesium oxide-containing spinel powder, granulation, molding and firing were performed in the same manner as in Example 1 to obtain a ceramic sintered body having a predetermined shape.

Example 9

A mixed powder of magnesium hydroxide and aluminum hydroxide was prepared by blending magnesium oxide and aluminum oxide in such a manner that the composition ratio of Mg and Al was 70:30 (MgO:Al$_2$O$_3$) in terms of an oxide equivalent ratio, and the mixed powder was then calcinated in an electric furnace at 1100° C. for 1 hour, and ground by a ball mill for 4 hours to obtain a magnesium oxide-containing spinel powder having a cumulative 50% particle diameter (D50) of 0.71 μm. Using the obtained magnesium oxide-containing spinel powder, granulation, molding and firing were performed in the same manner as in Example 1 to obtain a ceramic sintered body having a predetermined shape.

Comparative Example 1

A mixed powder of magnesium hydroxide and aluminum hydroxide was prepared by blending magnesium oxide and aluminum oxide in such a manner that the composition ratio of Mg and Al was 70:30 (MgO:Al$_2$O$_3$) in terms of an oxide equivalent ratio, and the mixed powder was then calcinated in an electric furnace at 1500° C. for 1 hour, and ground by a ball mill for 4 hours to obtain a magnesium oxide-containing spinel powder having a cumulative 50% particle diameter (D50) of 16.03 μm. Using the obtained magnesium oxide-containing spinel powder, granulation, molding and firing were performed in the same manner as in Example 1 to obtain a ceramic sintered body having a predetermined shape.

Comparative Example 2

A mixed powder of magnesium hydroxide and aluminum hydroxide was prepared by blending magnesium oxide and aluminum oxide in such a manner that the composition ratio of Mg and Al was 70:30 (MgO:Al$_2$O$_3$) in terms of an oxide equivalent ratio, and the mixed powder was then calcinated in a shuttle kiln at 1600° C. for 1 hour, and ground by a ball mill for 3 hours to obtain a magnesium oxide-containing spinel powder having a cumulative 50% particle diameter (D50) of 15.39 μm. Using the obtained magnesium oxide-containing spinel powder, granulation, molding and firing were performed in the same manner as in Example 1 to obtain a ceramic sintered body having a predetermined shape.

Comparative Example 3

The magnesium oxide-containing spinel powder prepared by the method in Example 9 and the magnesium oxide-containing spinel powder prepared by the method in Comparative Example 2 were thoroughly mixed in a dry process at a ratio of 75:25 to obtain a magnesium oxide-containing powder having a cumulative 50% particle diameter (D50) of 0.82 μm. Using the obtained magnesium oxide-containing spinel powder, granulation, molding and firing were performed in the same manner as in Example 1 to obtain a ceramic sintered body having a predetermined shape.

Comparative Example 4

A magnesium oxide powder having a cumulative 50% particle diameter (D50) of 1.20 µm and an aluminum oxide powder having a cumulative 50% particle diameter (D50) of 0.50 µm were blended in such a manner that the composition ratio of Mg and Al was 70:30 (MgO:Al$_2$O$_3$) in terms of an oxide equivalent ratio, and the mixture was thoroughly mixed in a dry process to obtain a mixed powder having a cumulative 50% particle diameter of 0.69 µm. The obtained mixed powder was not calcined and ground, i.e. a magnesium oxide-containing spinel powder was not obtained, and using the mixed powder, granulation, molding and firing were performed in the same manner as in Example 1 to obtain a ceramic sintered body having a predetermined shape.

Comparative Example 5

A mixed powder of magnesium hydroxide and aluminum hydroxide was prepared by blending magnesium oxide and aluminum oxide in such a manner that the composition ratio of Mg and Al was 30:70 (MgO:Al$_2$O$_3$) in terms of an oxide equivalent ratio, and the mixed powder was then calcinated in an electric furnace at 1000° C. for 1 hour, and ground by a ball mill for 4 hours to obtain a magnesium oxide-containing spinel powder having a cumulative 50% particle diameter (D50) of 1.84 µm. Using the obtained magnesium oxide-containing spinel powder, granulation, molding and firing were performed in the same manner as in Example 1 to obtain a ceramic sintered body having a predetermined shape.

The obtained results are collectively shown in Table 1.

It is apparent from Table 1 that when the magnesium oxide-containing spinel powder in each of Examples 1 to 9 was used, it was possible to produce a ceramic sintered body having high strength, a large Weibull coefficient value and excellent strength stability.

On the other hand, the magnesium oxide-containing spinel powder in Comparative Example 1 had a large cumulative 50% particle diameter (D50), and a large value of (D90-D50)/(D50-D10), the ceramic sintered body produced from the powder had low strength and a small Weibull coefficient value. The magnesium oxide-containing spinel powder in Comparative Example 2 had a large cumulative 50% particle diameter (D50), and the ceramic sintered body produced from the powder had low strength and a small Weibull coefficient value. The magnesium oxide-containing spinel powder in Comparative Example 3 had a large value of (D90-D50)/(D50-D10), and the ceramic sintered body produced from the powder had low strength and a small Weibull coefficient value. In Comparative Example 4, a ceramic sintered body was produced directly from a mixed powder of magnesium oxide and aluminum oxide without forming a spinel powder, and as a result, the obtained ceramic sintered body had low strength and a small Weibull coefficient value. The magnesium oxide-containing spinel powder in Comparative Example 5 had a low ratio of magnesium oxide, and the ceramic sintered body produced from the powder had low strength and a small Weibull coefficient value.

The invention claimed is:

1. A magnesium oxide-comprising oxide containing spinel powder, which has a volume-based cumulative 50% particle diameter (D50) in a range of from 0.30 to 10.00 µm, a ratio (D90-D50)/(D50-D10) of a difference between a volume-based cumulative 90% particle diameter (D90) and D50 to a difference between D50 and a volume-

TABLE 1

| Type of powder | Composition ratio (MgO:Al$_2$O$_3$) | purity % | D10 µm | D50 µm | D90 µm | (D90 − D50)/ (D50 − D10) | Loose bulk density g/cm$^3$ | Tight bulk density g/cm$^3$ | Bending strength MPa | Weibull coefficient |
|---|---|---|---|---|---|---|---|---|---|---|
| Example 1 | Spinel powder | 70:30 | 99.8 | 0.59 | 1.97 | 3.70 | 1.26 | 0.32 | 0.46 | 180 | 19.2 |
| Example 2 | Spinel powder | 50:50 | 99.8 | 0.65 | 1.94 | 5.78 | 2.99 | 0.37 | 0.55 | 153 | 13.9 |
| Example 3 | Spinel powder | 60:40 | 99.9 | 0.61 | 1.86 | 5.21 | 2.68 | 0.36 | 0.53 | 172 | 16.8 |
| Example 4 | Spinel powder | 80:20 | 99.9 | 0.56 | 1.69 | 3.25 | 1.37 | 0.30 | 0.44 | 196 | 17.6 |
| Example 5 | Spinel powder | 90:10 | 99.9 | 0.54 | 1.74 | 3.93 | 1.82 | 0.31 | 0.44 | 159 | 14.6 |
| Example 6 | Spinel powder | 70:30 | 99.8 | 0.59 | 2.20 | 5.94 | 2.32 | 0.29 | 0.41 | 154 | 15.5 |
| Example 7 | Spinel powder | 70:30 | 99.9 | 0.22 | 0.44 | 0.96 | 2.38 | 0.35 | 0.47 | 219 | 18.1 |
| Example 8 | Spinel powder | 70:30 | 99.8 | 0.59 | 1.63 | 3.01 | 1.34 | 0.85 | 1.12 | 203 | 17.3 |
| Example 9 | Spinel powder | 70:30 | 99.9 | 0.42 | 0.71 | 1.88 | 4.01 | 0.56 | 0.77 | 172 | 17.8 |
| Comparative Example 1 | Spinel powder | 70:30 | 99.8 | 4.39 | 16.03 | 120.40 | 8.97 | 0.25 | 0.35 | 97 | 12.5 |
| Comparative Example 2 | Spinel powder | 70:30 | 99.9 | 1.92 | 15.39 | 70.81 | 4.11 | 1.11 | 1.33 | 45 | 10.5 |
| Comparative Example 3 | Spinel powder | 70:30 | 99.9 | 0.42 | 0.82 | 2.97 | 5.41 | 0.67 | 0.91 | 129 | 12.8 |
| Comparative Example 4 | Mixed powder | 70:30 | 99.6 | 0.30 | 0.69 | 2.41 | 4.31 | 0.32 | 0.44 | 39 | 12.5 |
| Comparative Example 5 | Spinel powder | 30:70 | 99.8 | 0.71 | 1.84 | 4.20 | 2.08 | 0.34 | 0.48 | 12 | 8.5 | based cumulative 10% particle diameter (D10) in a range of from 1.0 to 5.0, and a composition ratio of Mg and Al, in terms of an oxide equivalent content, of 50 to 90% by weight of MgO and 10 to 50% by weight of $Al_2O_3$, based on 100% by weight of both of MgO and $Al_2O_3$ wherein D50, D90, and D10 are measured by a laser diffraction scattering particle size distribution measurement.

2. The magnesium oxide-comprising spinel powder of claim 1, which has a loose bulk density in a range of from 0.20 to 1.50 g/cm$^3$, and a tight bulk density in a range of from 0.30 to 2.50 g/cm$^3$.

3. The magnesium oxide-comprising spinel powder of claim 1, wherein a ceramic sintered body obtained by firing a molded product of the magnesium oxide-comprising spinel powder has a three-point bending strength of 150 MPa or more and a Weibull coefficient of 13.0 or more.

4. A method for producing the magnesium oxide-comprising spinel powder of claim 1, the method comprising:
(i) mixing at least one kind of magnesium source particles selected from magnesium hydroxide particles, magnesium oxide particles, magnesium carbonate particles, basic magnesium carbonate particles, magnesium nitrate particles, magnesium acetate particles and magnesium sulfate particles, with at least one kind of aluminum source particles selected from aluminum hydroxide particles, aluminum oxide particles, aluminum carbonate particles, aluminum nitrate particles, aluminum acetate particles and aluminum sulfate particles, to obtain a mixture, wherein the at least one kind of magnesium sources particles has a D50 in a range of from 0.50 to 100.00 µm, and the at least one kind of aluminum source particles has a D50 in a range of from 0.30 to 15.00 µm;

(ii) calcining the mixture at a temperature in a range of from 900 to 1400° C. for 0.1 to 10.0 hours, to obtain a product; and (iii) grinding the product.

5. A ceramic sintered body, obtained by firing a molded product of the magnesium oxide-comprising spinel powder of claim 1 and which has a three-point bending strength of 150 MPa or more and a Weibull coefficient of 13.0 or more.

* * * * *